(12) United States Patent
Kubota

(10) Patent No.: US 12,315,958 B2
(45) Date of Patent: May 27, 2025

(54) CONNECTION STRUCTURE OF LAMINATE CELLS, BATTERY PACK, AND METHOD OF CONNECTING LAMINATE CELLS

(71) Applicant: Prime Planet Energy & Solutions, Inc., Tokyo (JP)

(72) Inventor: Seiko Kubota, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 515 days.

(21) Appl. No.: 17/724,497

(22) Filed: Apr. 20, 2022

(65) Prior Publication Data

US 2022/0344781 A1 Oct. 27, 2022

(30) Foreign Application Priority Data

Apr. 23, 2021 (JP) .................................. 2021-073491

(51) Int. Cl.
| | |
|---|---|
| *H01M 50/516* | (2021.01) |
| *H01M 50/178* | (2021.01) |
| *H01M 50/211* | (2021.01) |
| *H01M 50/557* | (2021.01) |

(52) U.S. Cl.
CPC ....... *H01M 50/516* (2021.01); *H01M 50/178* (2021.01); *H01M 50/211* (2021.01); *H01M 50/557* (2021.01)

(58) Field of Classification Search
None
See application file for complete search history.

(56) References Cited

U.S. PATENT DOCUMENTS

| | | |
|---|---|---|
| 2013/0216879 A1 | 8/2013 | Egawa et al. |
| 2015/0303415 A1 | 10/2015 | Kayano et al. |
| 2019/0103624 A1 | 4/2019 | Lim et al. |
| 2020/0144580 A1 | 5/2020 | Hong et al. |
| 2020/0194768 A1 | 6/2020 | Choi et al. |
| 2020/0259158 A1 | 8/2020 | Motohashi et al. |
| 2020/0381691 A1 | 12/2020 | Chi et al. |
| 2022/0052423 A1 | 2/2022 | Kim et al. |

FOREIGN PATENT DOCUMENTS

| | | |
|---|---|---|
| CN | 104769746 A | 7/2015 |
| EP | 3240062 A1 | 11/2017 |
| EP | 3624300 A1 | 3/2020 |
| JP | H6-47182 B2 | 6/1994 |
| JP | 2002-205131 A | 7/2002 |
| JP | 2003-187781 A | 7/2003 |
| JP | 2006-172808 A | 6/2006 |
| JP | 2007-087907 A | 4/2007 |

(Continued)

*Primary Examiner* — Wyatt P McConnell
(74) *Attorney, Agent, or Firm* — HAUPTMAN HAM, LLP

(57) ABSTRACT

A connection structure of laminate cells is provided. Each of the laminate cells includes a pouch including a laminate film, an electrode assembly enclosed in the pouch, and a plate-shaped terminal connected internally of the pouch to the electrode assembly and extending out of the pouch along one side edge of the pouch. The plate-shaped terminal includes a bent tip. The pouches are stacked on each other, the bent tips of the plate-shaped terminals are overlapped with each other, and the bent tips are intermittently joined together in an overlapped portion where the bent tips are overlapped with each other.

3 Claims, 6 Drawing Sheets

(56) References Cited

FOREIGN PATENT DOCUMENTS

| | | | |
|---|---|---|---|
| JP | 2011-48912 | A | 3/2011 |
| JP | 2012-30559 | A | 2/2012 |
| JP | 2013-171733 | A | 9/2013 |
| JP | 2015-146232 | A | 8/2015 |
| JP | 2015-150578 | A | 8/2015 |
| JP | 2017-104877 | A | 6/2017 |
| JP | 2019-067676 | A | 4/2019 |
| JP | 2019-102215 | A | 6/2019 |
| JP | 2019-200884 | A | 11/2019 |
| JP | 2020-504427 | A | 2/2020 |
| JP | 2020-515004 | A | 5/2020 |
| JP | 2020-518988 | A | 6/2020 |
| KR | 10-2010-006712 | A | 6/2010 |
| KR | 20100066712 | * | 6/2010 |
| WO | 2006109610 | A1 | 10/2006 |
| WO | 2019/150903 | A1 | 8/2019 |
| WO | 2020/262852 | A1 | 12/2020 |

* cited by examiner

CONNECTION STRUCTURE OF LAMINATE CELLS, BATTERY PACK, AND METHOD OF CONNECTING LAMINATE CELLS

CROSS REFERENCE TO RELATED APPLICATIONS

The present application claims priority from Japanese Patent Application No. 2021-073491 filed on Apr. 23, 2021, which is incorporated by reference herein in its entirety.

BACKGROUND

The present invention relates to a connection structure of laminate cells, a battery pack, and a method of connecting laminate cells.

JP 2019-200884 A, which relates to a laminate-type electrical power storage element, discloses a structure in which electrode terminals of electrical power storage elements stacked and arranged in the Z-axis direction are connected to each other. In the structure disclosed in the publication, an electrode terminal provided so as to protrude from the battery body of an electrical power storage element and an electrode terminal provided so as to protrude from the battery body of another electrical power storage element are arranged so as to face each other in the Z-axis direction. The respective surfaces of the electrode terminal of one electrical power storage element and the electrode terminal of another electrical power storage element that do not face each other in the Z-axis direction are bent and joined to each other.

For example, as shown in FIG. 4 of the publication, an electrical power storage element (20) and another electrical power storage element (21) are arranged side by side horizontally in the X-axis direction. In that case, the surface (201a) of the tip portion of the electrode terminal (201) of the electrical power storage element (20) that faces in the Z2 direction is superposed on the surface (211a) of the tip portion of the electrode terminal (211) of the electrical power storage element (21) that faces in the Z1 direction. Further, a joining member (30) is placed on the surface (201b) of the tip portion of the electrode terminal (201) of the electrical power storage element (20) that faces in the Z1 direction. The tip portion of the electrode terminal (201) of the electrical power storage element (20), the tip portion of the electrode terminal (211) of the electrical power storage element (21), and the joining member (30) are stacked and arranged on top of each other, and thereafter, they are clamped by a joining jig (50) and joined to each other by ultrasonic welding or the like. Thereafter, the respective tip portions of the electrode terminal (201) of the electrical power storage element (20) and the electrode terminal (211) of the electrical power storage element (21) are bent, whereby the electrical power storage element (20) is oriented in the Z1 axis direction with respect to the electrical power storage element (21). Thus, the manufacturing of the electrical power storage device (10) shown in FIG. 1 is completed. The publication states that this makes it possible to reduce the stress applied to the respective base end portions (201c, 211c) of the electrode terminals (201, 211). In addition, FIG. 6 shows an embodiment in which the joining member (30) is not provided. Note that the characters indicated above in the parentheses are reference characters used in the publication, and the drawings mentioned above are the drawings referred to in the publication.

SUMMARY

When the electrode terminals are joined by ultrasonic welding as in JP 2019-200884 A, stress is applied to the base end portions of the electrode terminals. In the laminate cell, a laminate film is melt-bonded to the base end portions of the electrode terminals to seal the cell. For this reason, it is undesirable that stress is applied to the base end portions of the electrode terminals. Herein, a novel connection structure of laminate cells is disclosed.

According to the present disclosure, a connection structure of laminate cells includes a plurality of laminate cells, each including a pouch made of a laminate film, an electrode assembly enclosed in the pouch, and a plate-shaped terminal. The plate-shaped terminal is connected internally of the pouch to the electrode assembly and extends along one side edge of the pouch, and the plate-shaped terminal includes a bent tip. The pouches are stacked on each other, and the bent tips of the plate-shaped terminals are overlapped with each other. Also, the bent tips are intermittently joined together in an overlapped portion where the bent tips are overlapped with each other.

With the connection structure of laminate cells according to the present disclosure, a pair of plate-shaped terminals to be connected to each other are directly welded together without use of a bus bar. As a result, the bus bar becomes unnecessary, so that weight reduction can be achieved.

A battery pack according to the present disclosure includes a plurality of laminate cells. Each of the plurality of laminate cells includes a pouch including a laminate film, an electrode assembly enclosed in the pouch, and a plate-shaped terminal connected internally of the pouch and extending along one side edge of the pouch, the plate-shaped terminal including a bent tip. The plurality of laminate cells are arranged successively so that the pouches are stacked on each other. Adjacent ones of the plurality of laminate cells are configured so that the plate-shaped terminals are arranged opposite to each other, the bent tips are overlapped with each other, and the bent tips are intermittently joined together along a longitudinal axis of the laminate cells. In the just-described battery pack, the plate-shaped terminals of adjacent laminate cells are connected directly. As a result, the bus bar becomes unnecessary, so that reduction of the overall weight can be achieved.

According to the present disclosure, a method of connecting laminate cells includes the steps of preparing laminate cells, and connecting the laminate cells. Each of the laminate cells prepared in the step of preparing laminate cells includes a pouch made of a laminate film, an electrode assembly enclosed in the pouch, and a plate-shaped terminal. The plate-shaped terminal is connected internally of the pouch to the electrode assembly and extends along one side edge of the pouch, and the plate-shaped terminal includes a bent tip. The step of connecting laminate cells includes arranging a plate-shaped terminal of one of two adjacent laminate cells and a plate-shaped terminal of the other laminate cell to be opposed to each other, and securely holding the bent tip of the plate-shaped terminal of the one laminate cell and the bent tip of the plate-shaped terminal of the other laminate cell in an overlapped condition with a jig. The step of connecting laminate cells also includes laser welding together the bent tip of the plate-shaped terminal of the one laminate cell and the bent tip of the plate-shaped terminal of the other laminate cell in an overlapped portion where the bent tips are overlapped with each other, with the overlapped portion being securely held by the jig.

According to the just-described method of connecting laminate cells, the bent tips of a pair of plate-shaped terminals are welded together in an overlapped condition. As a result, precision of joining is improved in the overlapped portion of the bent tips of the pair of plate-shaped terminals, and accordingly, product yield and product quality are improved. Moreover, laser is caught by the elongated part even when it penetrates the overlapped portion. This prevents the pouches of the laminate cells from being damaged by the laser. Furthermore, stress is not easily applied to the base end portions of the plate-shaped terminals.

The overlapped portion where the bent tip of the plate-shaped terminal of the one laminate cell and the bent tip of the plate-shaped terminal of the other laminate cell are overlapped with each other includes mounting holes formed intermittently along a longitudinal axis of the laminate cells. The jig may include a first member and a fastening member. The first member may include an elongated part that is to be inserted into a gap space surrounded by opposing portions where the plate-shaped terminal of the one of the two laminate cells and the plate-shaped terminal of the other laminate cell are opposed to each other and by the overlapped portion where the bent tip of the plate-shaped terminal of the one laminate cell and the bent tip of the plate-shaped terminal of the other laminate cell are overlapped with each other. The fastening member includes a head portion and a shaft portion. The head portion is brought into contact with an outer surface of the overlapped portion of the plate-shaped terminals. The shaft portion may be inserted through the overlapped portion via a mounting hole and engaging with the elongated part, and the shaft portion may include a fastening mechanism narrowing the gap between the head portion and the elongated part.

In another embodiment, the jig may include a first member and a second member. The first member may include an elongated part including a magnetic material. Here, the elongated part is inserted into a gap space surrounded by opposing portions where the plate-shaped terminal of the one of the two laminate cells and the plate-shaped terminal of the other laminate cell are opposed to each other and by the overlapped portion where the bent tip of the plate-shaped terminal of the one laminate cell and the bent tip of the plate-shaped terminal of the other laminate cell are overlapped with each other. The second member may include a magnet that is brought into contact with an outer surface of the overlapped portion to attract the elongated part.

The elongated part may be recessed in regions that are opposed to locations of the overlapped portion of the bent tips that are to be laser welded.

DETAILED DESCRIPTION

Embodiments of the invention according to the present disclosure will be described hereinbelow. It should be noted, however, that the disclosed embodiments are, of course, not intended to limit the invention. The present invention is not limited to the embodiments described herein unless specifically stated otherwise. The drawings are depicted schematically and do not necessarily reflect actual objects. The features and components that exhibit the same effects are designated by the same reference symbols as appropriate, and the description thereof will not be repeated.

Figure 1:
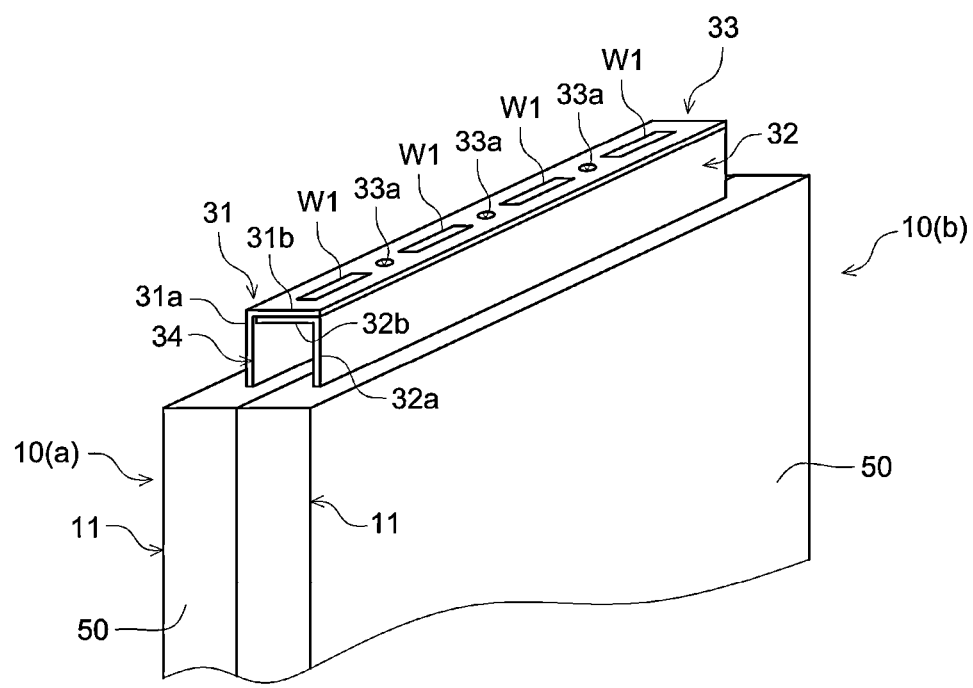
FIG. 1 is a perspective view schematically illustrating a connection structure of laminate cells 10.
Figure 2:
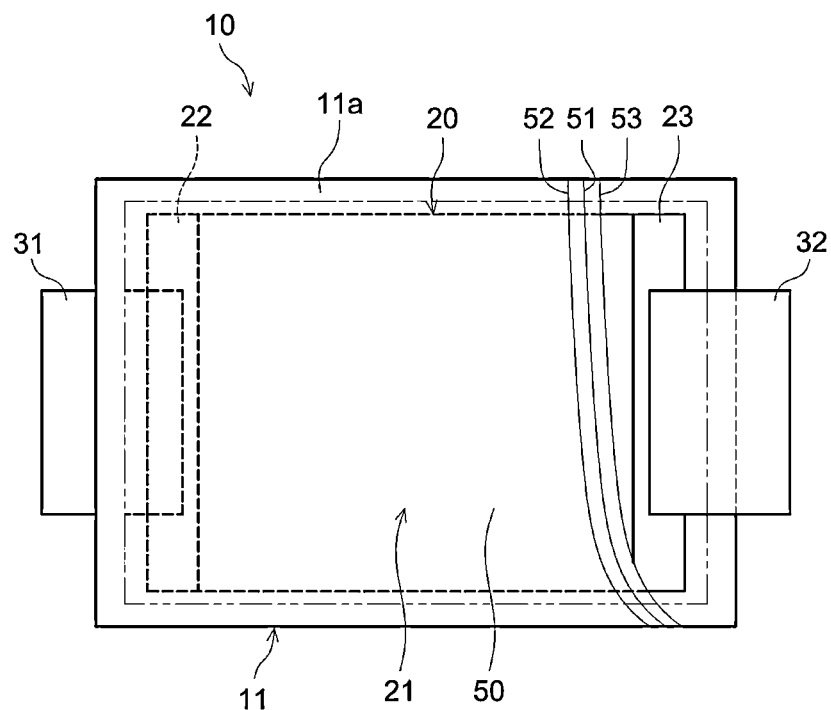
FIG. 2 is a plan view schematically illustrating a laminate cell 10.

FIG. 1 is a perspective view schematically illustrating a connection structure of laminate cells 10. FIG. 2 is a plan view schematically illustrating a laminate cell 10. In the laminate cell 10 shown in FIG. 2, a laminate film 50, which constitutes the outer casing material of the laminate cell 10, is partially cut out to show the internal structure of the laminate cell 10.

Laminate Cell 10

As illustrated in FIG. 2, the laminate cell 10 includes a pouch 11, an electrode assembly 20, and plate-shaped terminals 31 and 32.

In the present description, the term "laminate cell" refers to the smallest unit of electricity storage device that uses a laminate film as its outer casing material. The term "electricity storage device" refers to a device that is capable of charging and discharging. The electricity storage device may include lithium polymer battery and lithium-ion capacitor, in addition to a variety of batteries generally referred to as lithium-ion battery and lithium secondary battery. The secondary battery refers to a battery that is capable of charging and discharging repeatedly in association with transfer of charge carriers between positive and negative electrodes. The electricity storage device may use either an electrolyte solution or a solid electrolyte. For example, the secondary battery may be a secondary battery that uses what is called a liquid-type electrolyte solution, or may be what is called an all-solid-state battery. Note that each of the laminate cells 10 shown in FIG. 1 is one embodiment of the laminate cell 10 to which the connection structure disclosed herein is applicable. The structure of the laminate cell to which the connection structure disclosed herein is applicable is not limited to such an embodiment.

Laminate Film 50

The laminate film 50 is a film material that is used as an outer casing material of the electricity storage device. The laminate film 50 includes, for example, a metal sheet 51, an insulating resin layer 52 that covers the outer surface of the metal sheet 51, and a thermoplastic resin layer 53 that covers the inner surface of the metal sheet 51.

Here, the metal sheet 51 serves the role of imparting gas barrier properties for preventing entry of oxygen, moisture, and electrolyte solution to the laminate film 50. The metal sheet 51 may be a metal thin film, such as aluminum foil, copper foil, nickel foil, stainless steel foil, clad foil thereof, annealed foil thereof, or unannealed foil thereof. The metal sheet 51 may be a metal foil plated with an electrically conductive metal, such as nickel, tin, copper, and chromium. The metal sheet 51 may include a conversion coating as its undercoating. The conversion coating is a surface film that is formed by performing a conversion treatment on a surface of the metal sheet 51. Examples of the conversion treatment include a chromate treatment and a non-chromate conversion treatment using a zirconium compound.

The insulating resin layer 52 is an outside layer of the laminate film 50. The insulating resin layer 52 has electrically insulative properties and has a melting point such that it does not melt when melt-bonding the thermoplastic resin layer 53. Examples of the resin that is usable for the insulating resin layer 52 include resins having a sufficiently higher melting point than the resin used for the thermoplastic resin layer 53, such as polyamide and polyester. The insulating resin layer 52 may be a stretched film of these resins. In particular, from the viewpoint of moldability and strength, it is possible to use a biaxially-oriented polyamide film, a biaxially-oriented polyester film, or a multi-layer film including these films. It is also possible to use a multi-layer film in which a biaxially-oriented polyamide film and a biaxially-oriented polyester film are bonded together. Although not limited thereto, examples of the polyamide film include nylon 6 film, nylon 6, 6 film, MXD nylon film. Examples of the biaxially-oriented polyester film include a biaxially-oriented polybutylene terephthalate (PBT) film and a biaxially-oriented polyethylene terephthalate (PET) film.

The insulating resin layer 52 may contain a slip additive and/or solid microparticles. When a slip additive and/or solid microparticles are contained in the insulating resin layer 52, slippage of the surface of the insulating resin layer 52 is improved. The thickness of the insulating resin layer 52 may be, for example, from 9 µm to 50 µm. The insulating resin layer 52 may be a single layer or may include multiple stacked layers in order to improve the strength or the like.

The thermoplastic resin layer 53 is a layer that is formed inside of the metal sheet 51. The thermoplastic resin layer 53 may be provided with excellent chemical resistance against corrosion, which is required for electricity storage devices such as lithium-ion secondary batteries. The thermoplastic resin layer 53 is one that is to be thermally bonded when the inner surfaces of laminate films 50 are overlapped and bonded together, and the thermoplastic resin layer 53 has heat sealability.

In terms of chemical resistance and heat sealability, the thermoplastic resin layer 53 may be composed of polyethylene, polypropylene, olefin-based copolymer, an acid modified product thereof, or an ionomer thereof. Examples of the olefin-based copolymer include EVA (ethylene-vinyl acetate copolymer), EAA (ethylene-acrylic acid copolymer), and EMAA (ethylene-methacrylic acid copolymer). In addition, polyamide films (for example, nylon 12) and polyamide films are also usable. The thermoplastic resin layer 53 may be, for example, a thermoplastic resin unstretched film. Although not limited thereto, the thermoplastic resin unstretched film may be composed of polyethylene, polypropylene, olefin-based copolymer, an acid modified product thereof, or an ionomer thereof, in terms of chemical resistance and heat sealability. Examples of the olefin-based copolymer include EVA (ethylene-vinyl acetate copolymer), EAA (ethylene-acrylic acid copolymer), and EMAA (ethylene-methacrylic acid copolymer). In addition, polyamide films (for example, nylon 12) and polyamide films are also usable. The thermoplastic resin layer 53 may contain a slip additive and/or solid microparticles, in order to increase the slippage of the surface.

The thickness of the thermoplastic resin layer 53 may be set to a thickness such as to be able to sufficiently prevent the occurrence of pinholes. From such a viewpoint, the thickness of the thermoplastic resin layer 53 may be greater than or equal to 20 µm. In addition, it is desirable that the amount of the resin used be smaller. From such a viewpoint, the thickness of the thermoplastic resin layer 53 may be less than or equal to 100 µm, for example, less than or equal to 80 µm, preferably less than or equal to 50 µm. The thermoplastic resin layer 53 may be a single layer or may include multiple layers. An example of multi-layer film is a three-layer film in which random polypropylene films are layered on opposite sides of a block polypropylene film.

Pouch 11

The pouch 11 is made of laminate film 50. In this embodiment, the pouch 11 includes two rectangular-shaped laminate films 50 overlapped with each other, and the thermoplastic resin layer 53 is melt-bonded at a peripheral edge portion 11a. As a result, a pouch-shaped outer casing, which includes the laminate films 50, is formed. The electrode assembly 20 is enclosed in the space of the pouch 11 that is surrounded by the peripheral edge portion 11a where the thermoplastic resin layer 53 is melt-bonded. Note that the embodiment of the pouch 11 is not limited to such a structure. For example, it is also possible that a sheet of rectangular-shaped laminate film may be folded in half, and the overlapped peripheral edge portions may be melt-bonded together. In the peripheral edge portion 11a of the laminate film to be melt-bonded, the thermoplastic resin layer 53 may be folded over and thermally bonded.

Electrode Assembly 20

The electrode assembly 20 is a member that is enclosed in the pouch 11. The configuration of the electrode assembly 20 is not particularly limited, and may be similar to or the same as one that is used for conventionally known electricity storage devices. The electrode assembly 20 includes a positive electrode sheet and a negative electrode sheet. In the embodiment shown in FIG. 1, the electrode assembly 20 is a stacked electrode assembly in which a rectangular-shaped positive electrode sheet and a rectangular-shaped negative electrode sheet are stacked with the positive electrode sheet and the negative electrode sheet being electrically insulated from each other. In this embodiment, the electrode assembly 20 includes a stacked portion 21 in which electrodes are stacked. A current collector 22 of the positive electrode sheet protrudes from one longitudinal side of the stacked portion 21, and a current collector 23 of the negative electrode sheet protrudes from the opposite side thereof. The electrode assembly 20 is not limited to such an embodiment. For example, the electrode assembly 20 may be a flat wound electrode assembly in which a strip-shaped positive electrode sheet and a strip-shaped negative electrode sheet are stacked with their longitudinal axes being aligned in a uniform orientation and are wound around a winding axis that extends along the shorter axis.

Plate-Shaped Terminals 31 and 32

Each of the plate-shaped terminals 31 and 32 is connected internally of the pouch 11 to the electrode assembly 20. In this embodiment, the plate-shaped terminal 31 is connected to the current collector 22 of the positive electrode sheet. The plate-shaped terminal 32 is connected to the current collector 23 of the negative electrode sheet. Each of the plate-shaped terminals 31 and 32 extends out of the pouch 11 along one side edge of the pouch 11. The tips of the plate-shaped terminals 31 and 32 are bent in the manner as shown in FIG. 1.

In this embodiment, each of the plate-shaped terminals 31 and 32 is a rectangular-shaped plate member, as illustrated in FIG. 2. One longer side of the plate-shaped terminal 31, which forms the positive electrode terminal, is connected internally of the pouch 11 to the current collector 22 of the positive electrode sheet of the electrode assembly 20. One longer side of the plate-shaped terminal 32, which forms the negative electrode terminal, is connected internally of the pouch 11 to the current collector 23 of the negative electrode sheet of the electrode assembly 20. The plate-shaped terminal 31 and the current collector 22 of the positive electrode sheet may be joined together by, for example, welding. The plate-shaped terminal 32 and the current collector 23 of the negative electrode sheet may be joined together by, for example, welding.

The other one of the longer sides of each of the plate-shaped terminals 31 and 32 juts out of the pouch 11. Along the longitudinal axis of the plate-shaped terminals 31 and 32, the peripheral edge portion 11a of the laminate film 50 is melt-bonded to opposite surfaces of each of the plate-shaped terminals 31 and 32 at an intermediate position of the shorter side axis thereof. The tips of the plate-shaped terminals 31 and 32, which extend out of the pouch 11, are bent in the manner as shown in FIG. 1. In this embodiment, the tips of the plate-shaped terminals 31 and 32 extending out of the pouch 11 are rectangular plate members extending along the peripheral edge portion 11a of the pouch 11, and each of the tips of the plate-shaped terminals 31 and 32 are bent at substantially a right angle at an intermediate position of the tips extending out of the pouch 11.

As illustrated in FIG. 1, in the connection structure of laminate cells 10, the pouches 11 of two laminate cells 10 are stacked on each other, and the bent tips 31b and 32b of the plate-shaped terminals 31 and 32 are intermittently joined together in an overlapped condition in an overlapped portion 33. In this embodiment, the overlapped portion 33 in which the bent tips 31b and 32b of the plate-shaped terminals 31 and 32 are overlapped with each other is in an elongated rectangular shape. In the overlapped portion 33, the plate-shaped terminals 31 and 32 are welded together intermittently along its longitudinal axis at laterally intermediate positions. Weld spots W1 are formed by laser welding. In FIG. 1, one of the two laminate cells 10 shown in the figure is designated as a laminate cell 10(a), and the other one of the two laminate cells 10 is designated as a laminate cell 10(b). These designations are used likewise in FIG. 3, which will be discussed later.

A method of connecting laminate cells 10 includes the steps of preparing laminate cells 10 and connecting the laminate cells 10. Here, each of the laminate cells 10 that is prepared in the step of preparing laminate cells 10 includes a pouch 11, an electrode assembly 20, and plate-shaped terminals 31 and 32, as illustrated in FIG. 2.

Step of Connecting Laminate Cells 10

Figure 3:
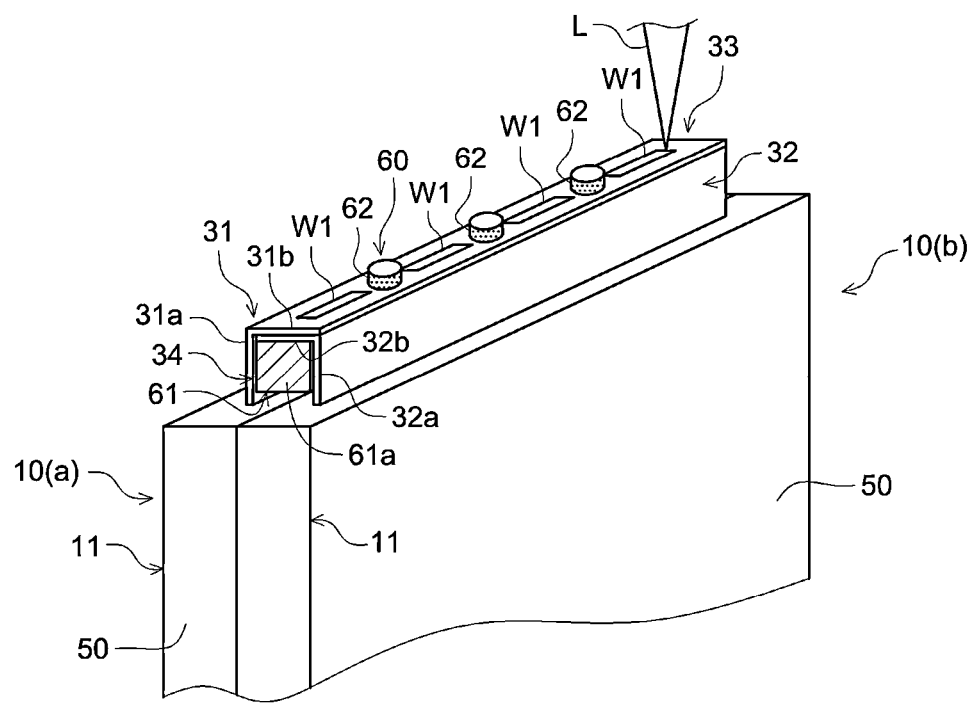
FIG. 3 is a perspective view schematically illustrating one embodiment of the step of connecting laminate cells 10.
Figure 4:
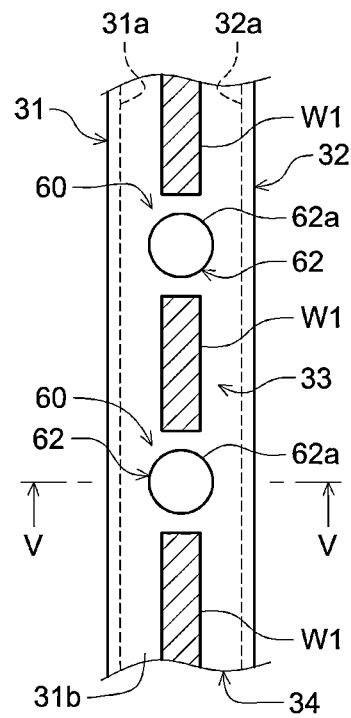
FIG. 4 is a plan view schematically illustrating one embodiment of the step of connecting laminate cells 10.
Figure 5:
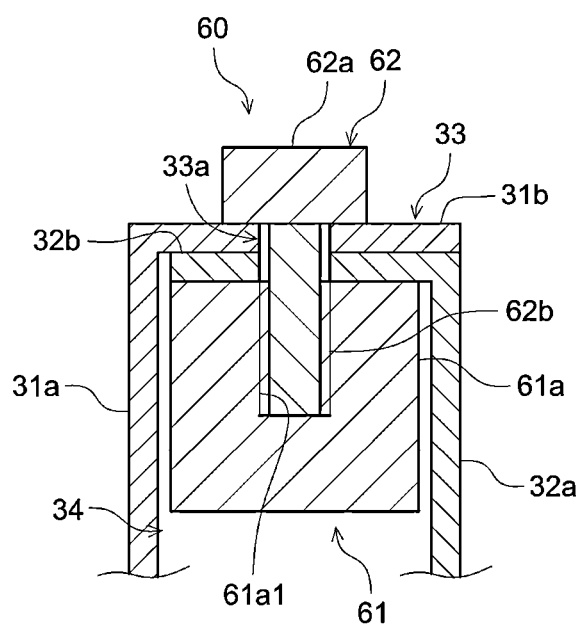
FIG. 5 is a cross-sectional view taken along line V-V in FIG. 4.

FIG. 3 is a perspective view schematically illustrating one embodiment of the step of connecting laminate cells 10. FIG. 4 is a plan view schematically illustrating one embodiment of the step of connecting laminate cells 10. FIG. 5 is a cross-sectional view taken along line V-V in FIG. 4.

The step of connecting laminate cells 10 involves arranging a plate-shaped terminal 31 of one laminate cell 10(a) of two adjacent laminate cells 10 and a plate-shaped terminal 32 of the other laminate cell 10(b) so as to be opposed to each other, and securely holding the bent tip of the plate-shaped terminal 31 of the one laminate cell 10(a) and the bent tip of the plate-shaped terminal 32 of the other laminate cell 10(b) in an overlapped condition with a jig 60. Then, with the bent tips 31b and 32b being securely held by the jig 60, the bent tip 31b of the plate-shaped terminal 31 of the one laminate cell 10(a) and the bent tip 32b of the plate-shaped terminal 32 of the other laminate cell 10(b) are laser welded together.

In the embodiment shown in FIG. 3, the overlapped portion 33, in which the bent tip 31b of the plate-shaped terminal 31 of the one laminate cell 10(a) and the bent tip 32b of the plate-shaped terminal 32 of the other laminate cell 10(b) are overlapped with each other, includes mounting holes 33a (see FIG. 1) that are intermittently formed along the longitudinal axis of the overlapped portion 33. The jig 60 includes a first member 61 and fastening members 62.

The first member 61 includes an elongated part 61a. The elongated part 61a is inserted into a gap space 34, which is surrounded by opposing portions 31a and 32a, where the plate-shaped terminal 31 of the one laminate cell 10(a) and the plate-shaped terminal 32 of the other laminate cell 10(b) are opposed to each other, and by the overlapped portion 33, where the bent tip 31b of the plate-shaped terminal 31 of the one laminate cell 10(a) and the bent tip 32b of the plate-shaped terminal 32 of the other laminate cell 10(b) are overlapped with each other. The elongated part 61a is inserted into the gap space 34 surrounded by the plate-shaped terminals 31 and 32 of the two laminate cells 10(a) and 10(b) from one direction.

Figure 6:
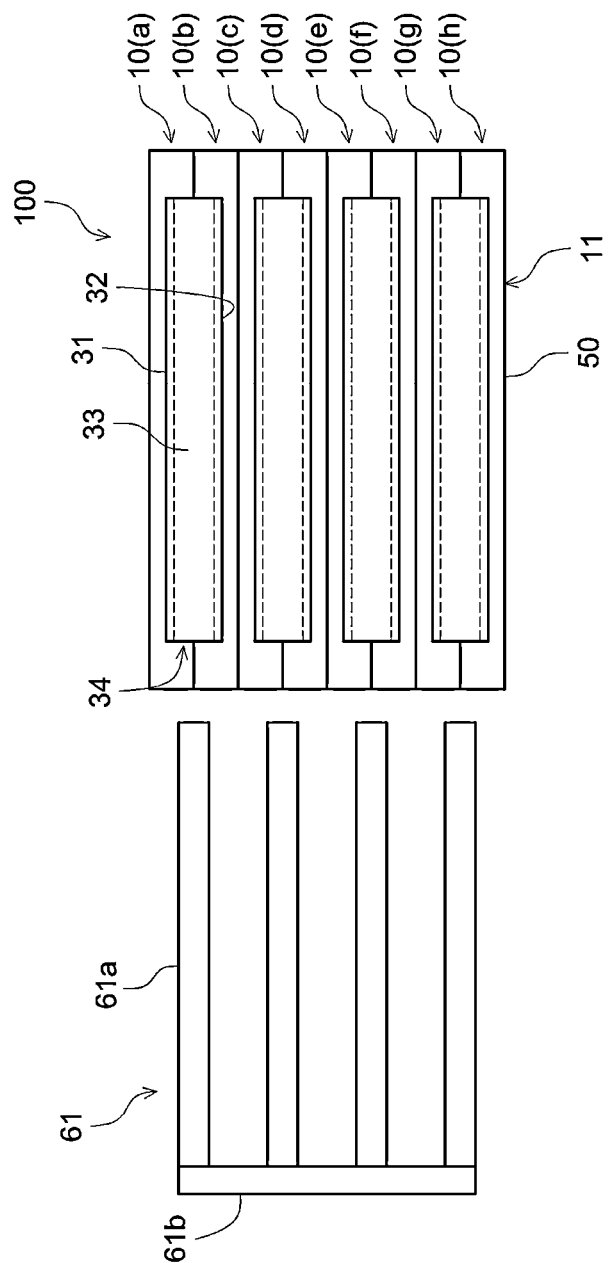
FIG. 6 is a schematic view illustrating the step of inserting an elongated part 61a into a gap space 34 that is formed by plate-shaped terminals 31 and 32 in each of a plurality of laminate cells 10(a) to 10(h).

FIGS. 3 to 5 shows a joining structure for joining two laminate cells 10, and the joining structure illustrated here may be used for the structure for successively joining a plurality of laminate cells 10. FIG. 6 is a schematic view illustrating the step of inserting the elongated part 61a into the gap space 34 that is formed by the plate-shaped terminals 31 and 32 in each of a plurality of laminate cells 10(a) to 10(h). As illustrated in FIG. 6, the first member 61 may have a structure in which a plurality of elongated parts 61a are arrayed in a comb-teeth shape. When this is the case, the elongated parts 61a of the first member 61 of the jig 60 may be arrayed in a comb-teeth shape at predetermined intervals so that, in the step of connecting laminate cells 10, the elongated parts 61a are inserted respectively into gap spaces 34 between pairs of plate-shaped terminals 31 and 32 of adjacent ones of the plurality of laminate cells 10(a) to 10(h). In this case, a base end portion 61b of the first member 61 may be operated so that the elongated parts 61a can be respectively inserted into the gap spaces 34 formed by the plate-shaped terminals 31 and 32 of the plurality of laminate cells 10. This allows the elongated parts 61a to be inserted at one time when joining a plurality of laminate cells 10 together. It is also possible that the plurality of laminate cells 10 may be laser welded together at one time.

Each of the fastening members 62 in this embodiment includes a head portion 62a and a shaft portion 62b. The head portion 62a is a portion that comes in contact with the outer surface of the overlapped portion 33 of a pair of plate-shaped terminals 31 and 32 of adjacent ones of the laminate cells 10. The shaft portion 62b is a portion that is inserted through the overlapped portion 33 through the mounting hole 33a (see FIG. 1) and engages with the elongated part 61a of the first member 61. The shaft portion 62b is provided with a fastening mechanism that narrows the gap between the head portion 62a and the elongated part 61a. In this embodiment, the shaft portion 62b is male-threaded, and the elongated part 61a is formed with a screw hole 61a1 to which the shaft portion 62b is fitted. The fastening member 62 is attached to the screw hole 61a1 of the elongated part 61a, and thereby, as illustrated in FIG. 5, the gap between the head portion 62a and the elongated part 61a is narrowed. Also, the inner surface of the overlapped portion 33 of the pair of plate-shaped terminals 31 and 32 of the adjacent laminate cells 10 is supported by the elongated part 61a.

The jig 60 may cause the plate-shaped terminal 31 of one of two adjacent laminate cells 10 and the plate-shaped terminal 32 of the other laminate cell 10 to be arranged so as to be opposed to each other, and may securely hold the bent tip 31b of the one laminate cell 10 and the bent tip 32b of the other laminate cell 10 in an overlapped condition. In the step of connecting laminate cells 10, the jig 60 securely holds the bent tip 31b of the plate-shaped terminal 31 of the one laminate cell 10(a) and the bent tip 32b of the plate-shaped terminal 32 of the other laminate cell 10(b) in an overlapped condition. As illustrated in FIG. 3, laser L is applied to the outer surface of the overlapped portion 33. As a result, the bent tips 31b and 32b are laser welded together in the overlapped portion 33, with the overlapped portion 33 being securely hold by the jig 60. At this time, the elongated part 61a of the jig 60 is disposed on the inner surface of the overlapped portion 33. Laser L is caught by the elongated part 61a even when it penetrates the overlapped portion 33. This prevents the pouches 11 of the laminate cells 10 from being damaged by the laser L. From such a viewpoint, the elongated part 61a may have required durability against the laser L. After the laser welding of the overlapped portion 33, the fastening members 62 may be removed, and the elongated part 61a may be pulled out from the gap space 34 between the pair of plate-shaped terminals 31 and 32. This accomplishes the connection structure of laminate cells as illustrated in FIG. 1.

In this embodiment, as illustrated in FIGS. 1 and 3, the overlapped portion 33 of the pair of plate-shaped terminals 31 and 32 is fastened intermittently along the longitudinal axis by the fastening members 62 of the jig 60. In the overlapped portion 33, the plate-shaped terminals 31 and 32 are laser welded together intermittently at regions between the fastening members 62 of the jig 60. In this embodiment, the plate-shaped terminals 31 and 32 are welded intermittently at the regions between the fastening members 62 of the jig 60 along the longitudinal axis. Each of the weld spots is formed in a linear shape along the longitudinal axis. Therefore, the pair of plate-shaped terminals 31 and 32 are firmly joined together in the overlapped portion 33 along the longitudinal axis.

Thus, the pouches 11 of the adjacent laminate cells 10(a) and 10(b) are stacked on each other. In addition, the bent tips 31b and 32b of the pair of plate-shaped terminals 31 and 32 of the adjacent laminate cells 10(a) and 10(b) are overlapped with each other, and the bent tips 31b and 32b intermittently joined together in the overlapped portion 33 where the bent tips 31b and 32b are overlapped with each other. In this case, the pair of plate-shaped terminals 31 and 32 are directly welded together without use of a bus bar. As a result, the bus bar becomes unnecessary, so that weight reduction can be achieved. Accordingly, it is possible to achieve weight reduction of a battery pack in which a plurality of laminate cells 10 are combined. In addition, the bent tips 31b and 32b of the pair of plate-shaped terminals 31 and 32 are intermittently joined together in the overlapped portion 33. As a result, sufficient strength is ensured in connecting the pair of plate-shaped terminals 31 and 32. The connection structure of laminate cells disclosed herein may be used as the connection structure for connecting at least some or all of the plurality of laminate cells that constitute a battery pack.

According to the method of connecting laminate cells 10 disclosed herein, the bent tips 31b and 32b of the pair of plate-shaped terminals 31 and 32 are welded together in an overlapped condition, with the bent tips 31b and 32b being securely held by the jig 60. As a result, precision of joining is improved in the overlapped portion 33 of the bent tips 31b and 32b of the plate-shaped terminals 31 and 32, and accordingly, product yield and product quality are improved. It is possible that a clad material may be adopted appropriately for the pair of plate-shaped terminals 31 and 32, and the same material may be used for the portions that are to be laser welded together. For example, lithium-ion secondary batteries use aluminum material for the positive electrode terminal and copper material for the negative electrode terminal. In this case, either one of the terminals may use a clad material so that the portions to be laser welded are made of the same material. For example, a clad material may be used for the negative electrode terminal. When this is the case, it is possible that the portion of the electrode assembly 20 to which the current collector 23 of the negative electrode sheet is connected may be made of copper, and the portion to be laser welded may be made of aluminum.

Figure 7:
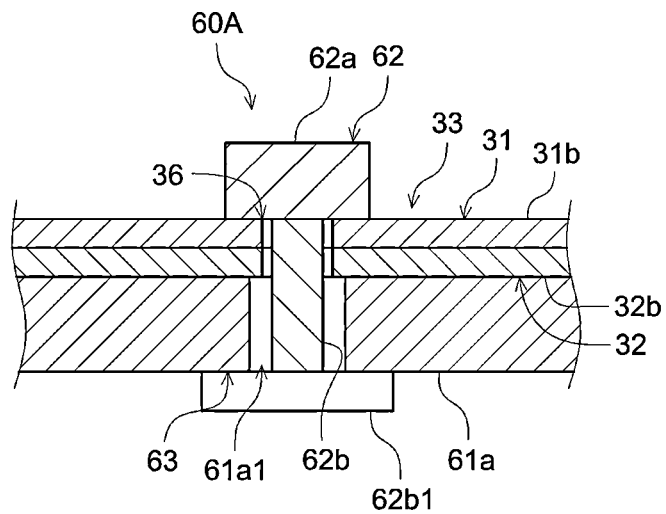
FIG. 7 is a cross-sectional view illustrating a jig 60A that securely holds an overlapped portion 33 in which the pair of plate-shaped terminals 31 and 32 are overlapped.

In the above-described embodiment, the elongated part 61a of the first member 61 and the fastening members 62 of the jig 60 are fastened together by a screw thread structure to narrow the gap the between the elongated part 61a and the head portions 62a of the fastening members 62. The fastening mechanism of the jig 60 is, however, not limited to such a screw thread structure. FIG. 7 is a cross-sectional view illustrating a jig 60A that securely holds an overlapped portion 33 in which the pair of plate-shaped terminals 31 and 32 are overlapped.

In the embodiment shown FIG. 7, a long hole 36 serving as a mounting hole is formed in the overlapped portion 33 of the pair of plate-shaped terminals 31 and 32 and in the elongated part 61a of the first member 61. The shaft portion 62b of the fastening member 62 is provided with an engaging piece 62b1 that can pass through the long hole 36. The engaging piece 62b1 is passed through the long hole 36 so as to fit the shaft portion 62b of the fastening member 62 to the overlapped portion 33 and the long hole 36. Then, as illustrated in FIG. 7, the engaging piece 62b1 is turned when the engaging piece 62b1 penetrates the elongated part 61a. As a result, the engaging piece 62b1 is engaged with the elongated part 61a. At this time, the engaging piece 62b1 may be provided at a required position relative to the shaft portion 62b so as to fasten the elongated part 61a and the overlapped portion 33 of the bent tips 31b and 32b of the plate-shaped terminals 31 and 32. It is also possible that, in a region where the engaging piece 62b1 and the elongated part 61a are in contact with each other, at least one of the engaging piece 62b1 and the elongated part 61a may be provided with a taper so that the engaging piece 62b1 can bite into the elongated part 61a. In this case, the fastening member 62 needs to be turned only about 90 degrees when fitting the fastening member 62. This allows the fastening member 62 to be fitted more easily than the screw thread structure.

Thus, the overlapped portion 33 where the plate-shaped terminal 31 of one laminate cell 10 and the plate-shaped terminal 32 of another laminate cell 10 are overlapped with each other may be fastened intermittently along their longitudinal axis. Also, the plate-shaped terminals 31 and 32 may be laser welded together intermittently in the regions between the head portions 62a of the fastening members 62, with the overlapped portion 33 of the plate-shaped terminals 31 and 32 being fastened intermittently along their longitudinal axis.

Thus, the jig 60 may include a fastening member 62 and a first member 61 including an elongated part 61a. The elongated part 61a is inserted into the gap space 34, which is surrounded by opposing portions 31a and 32a, where the plate-shaped terminal 31 of the one laminate cell 10(a) and the plate-shaped terminal 32 of the other laminate cell 10(*b*) are opposed to each other, and the overlapped portion 33, where the bent tips 31*b* and 32*b* are overlapped with each other. The head portion 62*a* of the fastening member 62 comes into contact with the outer surface of the overlapped portion 33. The shaft portion 62*b* of the fastening member 62 is inserted through the overlapped portion 33 via the mounting hole 33*a*. The shaft portion 62*b* is provided with a fastening mechanism that engages with the elongated part 61*a* and narrows the gap between the head portion 62*a* and the elongated part 61*a*. Examples of the fastening mechanism include a screw thread structure and an engaging structure as described above.

Figure 8:
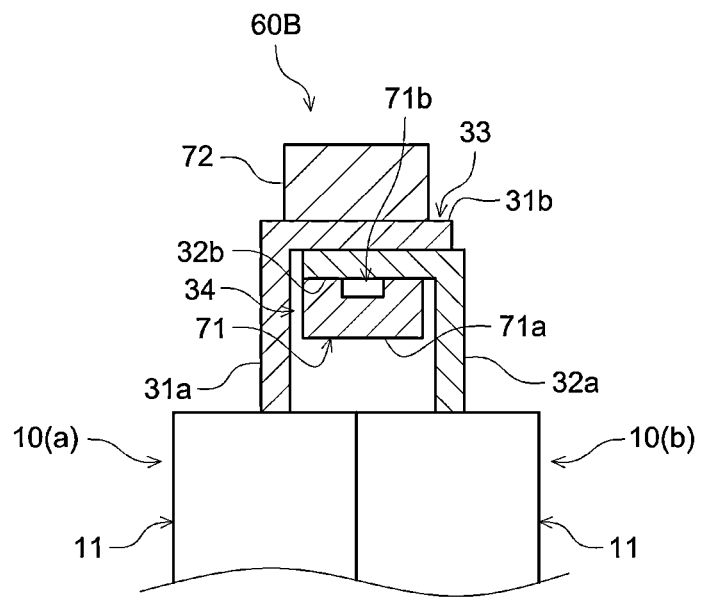
FIG. 8 is a cross-sectional view illustrating a jig 60B that securely holds the overlapped portion 33 in which the pair of plate-shaped terminals 31 and 32 are overlapped.

FIG. 8 is a cross-sectional view illustrating a jig 60B that securely holds the overlapped portion 33 in which the pair of plate-shaped terminals 31 and 32 are overlapped. The jig 60B includes a first member 71 and second members 72. The first member 71 includes an elongated part 71*a* made of a magnetic material. The elongated part 71*a* is inserted into a gap space 34, which is surrounded by opposing portions 31*a* and 32*a*, where the plate-shaped terminal 31 of the one laminate cell 10(*a*) and the plate-shaped terminal 32 of the other laminate cell 10(*b*) are opposed to each other, and the overlapped portion 33, where the bent tip 31*b* of the plate-shaped terminal 31 of the one laminate cell 10(*a*) and the bent tip 32*b* of the plate-shaped terminal 32 of the other laminate cell 10(*b*) are overlapped with each other. The second member 72 includes a magnet that is brought into contact with the outer surface of the overlapped portion 33 to attract the elongated part 71*a*. In this case as well, the plate-shaped terminals 31 and 32 may be laser welded together intermittently in regions between the second members 72, with the overlapped portion 33 of the plate-shaped terminals 31 and 32 fastened by the second members 72 intermittently along their longitudinal axis. After the plate-shaped terminals 31 and 32 are laser welded in the overlapped portion 33, the second members 72 may be removed, and the elongated part 71*a* of the first member 71 may be pulled out from the gap space 34 between the pair of plate-shaped terminals 31 and 32.

In the embodiment shown in FIG. 8, each of the second members 72 is composed of a magnet to attract the elongated part 71*a* of the first member 71. This serves to facilitate the fitting of the jig 60B. Each of the second members 72 may be composed of an electromagnet. This makes it possible to electrically control the fitting of the jig 60B. Therefore, the fitting and removal of the jig 60B can be made more easily. The elongated part 71*a* of the first member 71 may be made of a ferromagnetic material such as iron or steel. Furthermore, in the embodiment shown in FIG. 8, the elongated part 71*a* is recessed in regions 71*b* that are opposed to the locations of the overlapped portion 33 of the tips 31*b* and 32*b* of the pair of plate-shaped terminals 31 and 32 that are laser welded together. As a result, the elongated part 71*a* is not in contact with the locations of the overlapped portion 33 that are to be laser welded, so the overlapped portion 33 is unlikely to be welded to the elongated part 71*a*. The embodiments of the elongated parts 61*a* and 71*a* are not limited to that shown in FIG. 8, which uses a magnet, but the elongated parts 61*a* and 71*a* may be provided with recesses in regions 71*b* that are opposed to the weld spots W1, in which the plate-shaped terminals are laser welded together in the overlapped portion 33 (see FIGS. 3 and 8).

Figure 9:
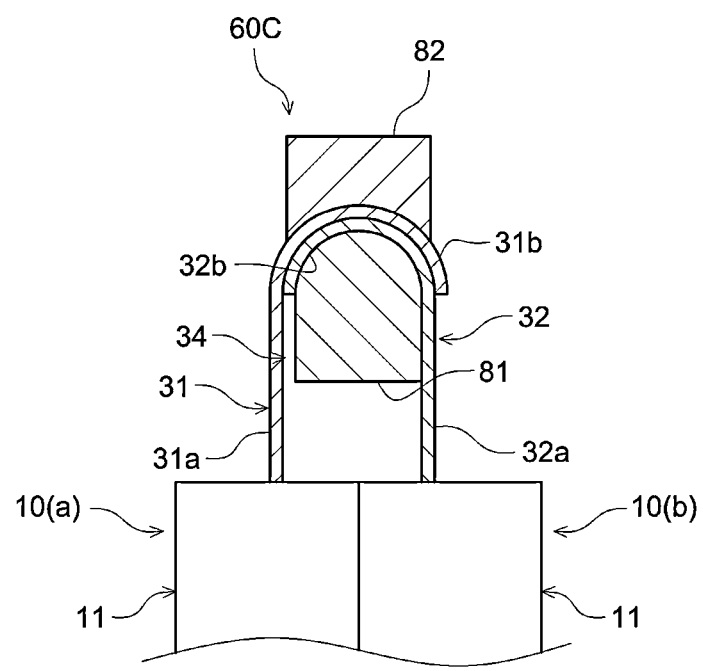
FIG. 9 is a cross-sectional view illustrating another embodiment of the pair of plate-shaped terminals 31 and 32 to be joined to each other.

FIG. 9 is a cross-sectional view illustrating another embodiment of the pair of plate-shaped terminals 31 and 32 to be joined to each other. In the foregoing embodiments, the tips 31*b* and 32*b* of the pair of plate-shaped terminals 31 and 32 that are to be joined together are in a flat plate shape, but this is merely illustrative. For example, as illustrated in FIG. 9, the tips 31*b* and 32*b* of the pair of plate-shaped terminals 31 and 32 that are to be joined may be in a circular arc shape. In this case, a first member 81 and a second member 82 of a jig 60C may have circular arc-shaped cross sections respectively corresponding to the shapes of the tips 31*b* and 32*b* of the pair of plate-shaped terminals 31 and 32 that are overlapped with each other.

According to the method of connecting laminate cells, the bent tips 31*b* and 32*b* of the plate-shaped terminals 31 and 32 of two adjacent laminate cells 10(*a*) and 10(*b*) are laser welded in the overlapped portion 33, with the bent tips 31*b* and 32*b* being securely held by the jig 60. As a result, the pair of plate-shaped terminals 31 and 32 of the laminate cells 10 are directly welded together without use of a bus bar. Moreover, because the elongated part 61*a* is inserted on the back side of the locations to which laser L is applied, the laser L is caught by the elongated part 61*a* even when the laser L penetrates the overlapped portion 33. This serves to prevent the pouches 11 of the laminate cells 10 from being damaged by the laser L.

Battery Pack 100

The connection method and the connection structure described above are applicable to a battery pack 100 in which a plurality of laminate cells 10(*a*) to 10(*h*) are connected together, as illustrated in FIG. 6.

The battery pack 100 to which the connection method and the connection structure described above are applied includes, as illustrated in FIG. 6, a plurality of laminate cells 10(*a*) to 10(*h*) each including a pouch 11 made of a laminate film 50, an electrode assembly 20 (see FIG. 2) enclosed in the pouch 11, and plate-shaped terminals 31 and 32. Each of the plate-shaped terminals 31 and 32 is connected internally of the pouch 11 to the electrode assembly 20 and extends along one side edge of the pouch 11, and the plate-shaped terminals 31 and 32 respectively include bent tips 31*b* and 32*b*. The plurality of laminate cells 10(*a*) to 10(*h*) are arranged successively so that the pouches 11 are stacked on each other. Adjacent ones of the plurality of laminate cells 10(*a*) to 10(*h*) are such that the plate-shaped terminals 31 and 32 are arranged opposite to each other, and the bent tips 31*b* and 32*b* are overlapped with each other. The tips 31*b* and 32*b* are joined intermittently along the longitudinal axis.

As described above, this battery pack 100 may be able to eliminate the need for the bus bar for joining adjacent laminate cells 10 together. As a result, weight reduction of the battery pack 100 is achieved. In addition, the bent tips 31*b* and 32*b* of the pair of plate-shaped terminals 31 and 32 are intermittently joined together in the overlapped portion 33. As a result, sufficient strength is ensured in connecting the pair of plate-shaped terminals 31 and 32.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

The invention claimed is:

1. A method of connecting laminate cells, comprising:
preparing laminate cells; and
connecting the laminate cells to each other, wherein:

each of the laminate cells prepared in the step of preparing the laminate cells comprises:
  a substantially rectangular-shaped pouch including a laminate film;
  an electrode assembly enclosed in the pouch; and
  a plate-shaped terminal connected internally of the pouch to the electrode assembly and extending out of the pouch along one side edge of the pouch, the terminal including a bent tip; and
the step of connecting the laminate cells further comprises:
  arranging the plate-shaped terminal of one of two adjacent laminate cells and the plate-shaped terminal of the other one of the two adjacent laminate cells so as to be opposed to each other, and securely holding the bent tip of the plate-shaped terminal of the one laminate cell and the bent tip of the plate-shaped terminal of the other laminate cell in an overlapped condition with a jig; and
  laser welding together the bent tip of the plate-shaped terminal of the one laminate cell and the bent tip of the plate-shaped terminal of the other laminate cell in an overlapped portion where the bent tips are overlapped with each other, with the overlapped portion being securely held by the jig, wherein:
the overlapped portion where the bent tip of the plate-shaped terminal of the one laminate cell and the bent tip of the plate-shaped terminal of the other laminate cell are overlapped with each other includes mounting holes formed intermittently along a longitudinal axis of the laminate cells; and
the jig comprises:
  a first member including an elongated part that is to be inserted into a gap space surrounded by opposing portions where the plate-shaped terminal of the one of the two laminate cells and the plate-shaped terminal of the other laminate cell are opposed to each other and by the overlapped portion where the bent tip of the plate-shaped terminal of the one laminate cell and the bent tip of the plate-shaped terminal of the other laminate cell are overlapped with each other; and
  a fastening member including a head portion and a shaft portion, the head portion being brought into contact with an outer surface of the overlapped portion, the shaft portion being inserted through the overlapped portion via a mounting hole and engaging with the elongated part of the first member, and the shaft portion including a fastening mechanism narrowing the gap between the head portion and the elongated part.

2. A method of connecting laminate cells, comprising:
preparing laminate cells; and
connecting the laminate cells to each other, wherein:
each of the laminate cells prepared in the step of preparing the laminate cells comprises:
  a substantially rectangular-shaped pouch including a laminate film;
  an electrode assembly enclosed in the pouch; and
  a plate-shaped terminal connected internally of the pouch to the electrode assembly and extending out of the pouch along one side edge of the pouch, the terminal including a bent tip; and
the step of connecting the laminate cells further comprises:
  arranging the plate-shaped terminal of one of two adjacent laminate cells and the plate-shaped terminal of the other one of the two adjacent laminate cells so as to be opposed to each other, and securely holding the bent tip of the plate-shaped terminal of the one laminate cell and the bent tip of the plate-shaped terminal of the other laminate cell in an overlapped condition with a jig; and
  laser welding together the bent tip of the plate-shaped terminal of the one laminate cell and the bent tip of the plate-shaped terminal of the other laminate cell in an overlapped portion where the bent tips are overlapped with each other, with the overlapped portion being securely held by the jig, wherein:
the jig comprises:
  a first member including an elongated part made of a magnetic material, the elongated part to be inserted into a gap space surrounded by opposing portions where the plate-shaped terminal of the one of the two laminate cells and the plate-shaped terminal of the other laminate cell are opposed to each other and by the overlapped portion where the bent tip of the plate-shaped terminal of the one laminate cell and the bent tip of the plate-shaped terminal of the other laminate cell are overlapped with each other; and
  a second member including a magnet that is to be brought into contact with an outer surface of the overlapped portion to attract the elongated part.

3. A method of connecting laminate cells, comprising:
preparing laminate cells; and
connecting the laminate cells to each other, wherein:
each of the laminate cells prepared in the step of preparing the laminate cells comprises:
  a substantially rectangular-shaped pouch including a laminate film;
  an electrode assembly enclosed in the pouch; and
  a plate-shaped terminal connected internally of the pouch to the electrode assembly and extending out of the pouch along one side edge of the pouch, the terminal including a bent tip; and
the step of connecting the laminate cells further comprises:
  arranging the plate-shaped terminal of one of two adjacent laminate cells and the plate-shaped terminal of the other one of the two adjacent laminate cells so as to be opposed to each other, and securely holding the bent tip of the plate-shaped terminal of the one laminate cell and the bent tip of the plate-shaped terminal of the other laminate cell in an overlapped condition with a jig; and
    laser welding together the bent tip of the plate-shaped terminal of the one laminate cell and the bent tip of the plate-shaped terminal of the other laminate cell in an overlapped portion where the bent tips are overlapped with each other, with the overlapped portion being securely held by the jig, wherein the jig comprises:
  a first member including an elongated part that is to be inserted into a gap space surrounded by opposing portions where the plate-shaped terminal of the one of the two laminate cells and the plate-shaped terminal of the other laminate cell are opposed to each other and by the overlapped portion where the bent tip of the plate-shaped terminal of the one laminate cell and the bent tip of the plate-shaped terminal of the other laminate cell are overlapped with each other, and the elongated part is recessed in regions opposing locations of the overlapped portion of the bent tips that are to be laser welded.

\* \* \* \* \*